United States Patent
Lockwood

(10) Patent No.: US 9,375,018 B2
(45) Date of Patent: Jun. 28, 2016

(54) ANIMAL HIDE REMOVAL APPARATUS

(71) Applicant: Brad Lockwood, Brookville, PA (US)

(72) Inventor: Brad Lockwood, Brookville, PA (US)

(*) Notice: Subject to any disclaimer, the term of this patent is extended or adjusted under 35 U.S.C. 154(b) by 0 days.

(21) Appl. No.: 14/602,859

(22) Filed: Jan. 22, 2015

(65) Prior Publication Data

US 2015/0201629 A1    Jul. 23, 2015

Related U.S. Application Data

(60) Provisional application No. 61/930,338, filed on Jan. 22, 2014.

(51) Int. Cl.
*A22B 5/00* (2006.01)
*A22B 5/16* (2006.01)

(52) U.S. Cl.
CPC .................................. *A22B 5/161* (2013.01)

(58) Field of Classification Search
CPC .......... A22B 1/00; A22B 5/00; A22B 5/0017; A22B 5/0047; A22B 5/16; A22B 5/168; A22B 5/20; A22C 17/00
USPC ......... 452/125, 128, 185, 187, 189, 132, 133; 254/325, 283, 284, 335
See application file for complete search history.

(56) References Cited

U.S. PATENT DOCUMENTS

| | | | |
|---|---|---|---|
| 3,404,431 A | 10/1968 | Knauss | |
| 3,894,311 A | 7/1975 | Johnson | |
| 5,211,601 A | 5/1993 | Cope | |
| 5,304,091 A | 4/1994 | Wilkinson | |
| 5,336,129 A | 8/1994 | Frith | |
| 5,482,501 A | 1/1996 | Frits | |
| 5,562,534 A * | 10/1996 | McGough | 452/187 |
| 5,643,073 A * | 7/1997 | Tice | 452/125 |
| 6,045,442 A | 4/2000 | Bounds | |
| 6,202,868 B1 * | 3/2001 | Murray | 212/294 |
| 6,250,483 B1 * | 6/2001 | Frommer | 212/180 |
| 7,059,955 B2 * | 6/2006 | Green et al. | 452/189 |
| 7,244,173 B2 | 7/2007 | Lake | |
| 7,549,545 B1 | 6/2009 | Ashmore | |
| 7,588,487 B1 | 9/2009 | Born, Jr. | |
| 7,625,269 B2 | 12/2009 | Godwin | |
| 7,931,524 B2 * | 4/2011 | McKenzie | 452/187 |
| 8,210,912 B2 * | 7/2012 | Ugiansky | A22B 5/06 452/187 |
| 8,777,703 B1 * | 7/2014 | Herron | 452/128 |
| 2002/0094771 A1 | 7/2002 | Butler | |
| 2002/0173262 A1 | 11/2002 | Stiefel | |

OTHER PUBLICATIONS

Official Action for U.S. Appl. No. 14/602,859, mailed Jul. 10, 2015, 6 pages.
Notice of Allowance for U.S. Appl. No. 14/602,859, mailed Oct. 30, 2015, 5 pages.

* cited by examiner

*Primary Examiner* — Richard Price, Jr.
(74) *Attorney, Agent, or Firm* — Sheridan Ross P.C.

(57) ABSTRACT

An animal hide removal apparatus is provided. The apparatus may have a plurality of pulleys and winches that are associated with cables that are selectively connected to a carcass. Operation of the winches moves the cables in opposite directions to remove the hide from the animal.

18 Claims, 5 Drawing Sheets

ANIMAL HIDE REMOVAL APPARATUS

This application claims the benefit of U.S. Provisional Patent Application Ser. No. 61/930,338, filed Jan. 22, 2014, which is incorporated by reference in its entirety herein.

FIELD OF THE INVENTION

Embodiments of the present invention are generally related to apparatus used to remove a hide from an animal carcass.

SUMMARY OF THE INVENTION

Embodiments of the present invention are directed to apparatus for selective interconnection to a vehicle, such as a truck, that facilitate removal of an animal hide, such as a deer or an elk. Now, hunters must elevate an often heavy carcass from the ground or a truck bed using block and tackle or ropes that are connected to a tree or other elevated surface. As one of skill in the art will appreciate, the prior art methods are difficult and time-consuming to implement.

Thus, it is one aspect of embodiments of the present invention to provide an apparatus that is quickly and easily assembled by a hunter. The contemplated apparatus also allows the hunter to manually hoist the carcass and removes its hide.

It is yet another aspect of embodiments of the present invention to provide a hide removal apparatus, comprising: a roller section adapted for interconnection to a vehicle, the roller section having a roller operatively interconnected thereto; a riser interconnected to the roller section; a winch segment having a portion interconnected to the riser, the winch segment including a first winch, a second winch, and selectively deployable first and second arms, the first and second arms having first ends that are rotateably interconnected to an upper portion of the winch segment and second ends, wherein pulleys are operatively associated with the first ends and the second ends; a lift cable interconnected to the first winch, and operatively engaged onto pulleys of the first arm, the lift cable having hooks adapted for selectively interconnecting to a portion of a carcass; and a puller cable interconnected to the second winch, and operatively engaged onto pulleys of the second arm, the puller cable having a cinch adapted for selectively interconnecting to another portion of the carcass.

It is still yet another aspect of embodiments of the present invention to provide a hide removal apparatus, comprising: a roller section adapted for interconnection to a vehicle, the roller section having a roller operatively interconnected thereto; a riser selectively interconnected to the roller section; a winch segment interconnected to the riser, the winch segment including a first winch, a second winch, and first and second arms, the first and second arms having first ends that generally coincide with an upper portion of the winch segment and second ends, the first and second arms having means for operatively receiving and supporting a cable; a lift cable interconnected to the first winch, and operatively engaged onto the means for operatively receiving and supporting a cable of the first arm, the lift cable having an end for selective interconnection of a carcass; and a puller cable interconnected to the second winch, and operatively engaged onto the means for operatively receiving and supporting a cable of the first arm, the lift cable having an end for selective interconnection to another portion of the carcass.

It is another aspect of embodiments of the present invention to provide a method of removing a hide from an animal, comprising: interconnecting a first end of a lift cable to a first portion of an animal; interconnecting a second end of the lift cable to a first winch; interconnecting a first end is a puller cable to a second portion of an animal; interconnecting a second end of the puller cable to a second winch; winding the first winch to raise the animal a predetermined distance above the ground; and winding the second winch to pull the hide from the carcass.

The Summary of the Invention is neither intended nor should it be construed as representing the full extent and scope of the present invention. Moreover, references made to "the present invention" or aspects thereof should be understood to mean certain embodiments of the present invention and should not be construed as limiting all embodiments to a particular description. The present invention is set forth in various levels of detail in the Summary of the Invention and in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
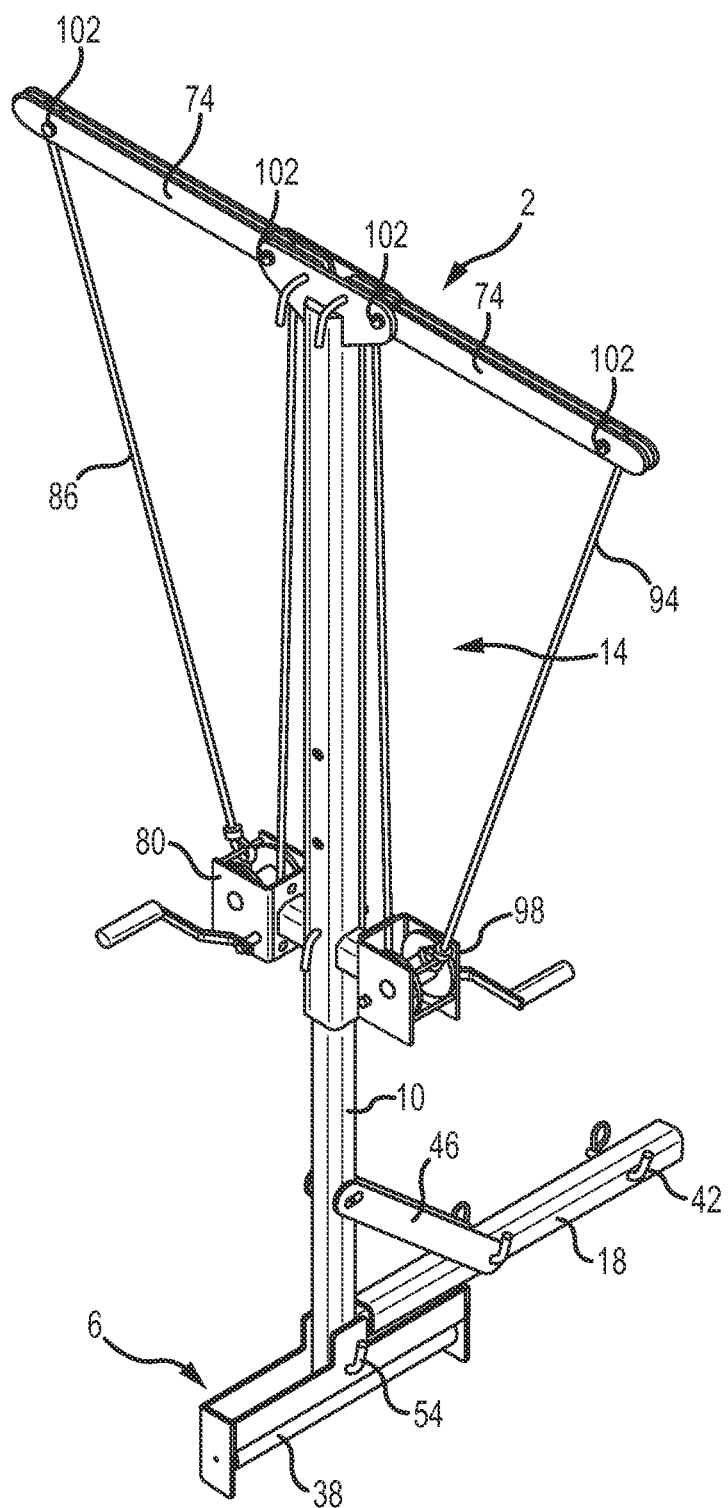
FIG. 1 is a perspective view of one embodiment of the present invention.

To assist in the understanding of one embodiment of the present invention, the following list of components and associated numbering found in the drawings is provided.

| # | Component |
| --- | --- |
| 2 | Hide removal apparatus |
| 6 | Roller section |
| 10 | Riser |
| 14 | Winch segment |
| 18 | Tube |
| 22 | Trailer hitch receiver |
| 26 | Bumper |
| 30 | First hole |
| 34 | Second hole |
| 38 | Roller |
| 42 | Pin |
| 46 | Stabilizer |
| 50 | Holes |
| 54 | Pin |
| 58 | Height adjustment holes |
| 62 | End |
| 66 | Hole |
| 70 | Pin |
| 74 | Arm |
| 78 | Upper end |

-continued

| # | Component |
|---|---|
| 80 | Lift winch |
| 82 | End |
| 86 | Lift cable |
| 90 | End |
| 94 | Puller cable |
| 98 | Puller winch |
| 102 | Pulley |
| 106 | Hook |
| 110 | Gabrel |
| 114 | Cinch |
| 118 | Lip |
| 122 | Pin |
| 126 | Vehicle |
| 130 | Carcass |
| 134 | Hide |
| 138 | Rear legs |
| 146 | Tuft |
| 150 | Front legs |
| 154 | Neck |
| 158 | Head |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIGS. 1-5 show the hide removal apparatus 2 of one embodiment of the present invention that is generally comprised of the roller section 6, a riser 10, and a winch segment 14. The hide removal apparatus 2, which is preferably stored in component pieces, can be assembled by a lone hunter. To assemble the hide removal apparatus 2 of one embodiment, a tube 18 of the roller section 6 is inserted into a trailer hitch receiver 22 commonly associated with truck rear bumpers 26. The roller section 6 includes a first hole 30 and a second hole 34 for receipt of the riser 10, which will be discussed below. The roller section 6 also includes a roller 38 associated with an underside portion of the roller section 6. The tube 18 interconnects to a trailer hitch receiver 22 by way of a pin 42, an interconnection method generally used to attach the trailer hitch to the trailer hitch receiver 22. The roller section 6 may also include a stabilizer 46 welded or otherwise interconnected to the tube 18. The stabilizer 46 includes a plurality of holes 50, which will be described in further detail below.

After the roller section 6 is interconnected to the trailer hitch receiver 22, the riser 10 is interconnected to the roller section 6. Initially, the riser 10 is placed in a generally horizontal orientation and a first hole 30, which is located adjacent to the end of the riser 10 (not shown), is aligned with the first hole 30 of the roller section 6. The hunter then places a pin 54 through the roller section first hole 30 and the corresponding riser hole, which rotatably fastens the riser 10 to the roller section 6. The riser 10 includes a plurality of height adjustment holes 58 on an end 62 opposite the end that interconnects to the roller section 6.

Figure 2:
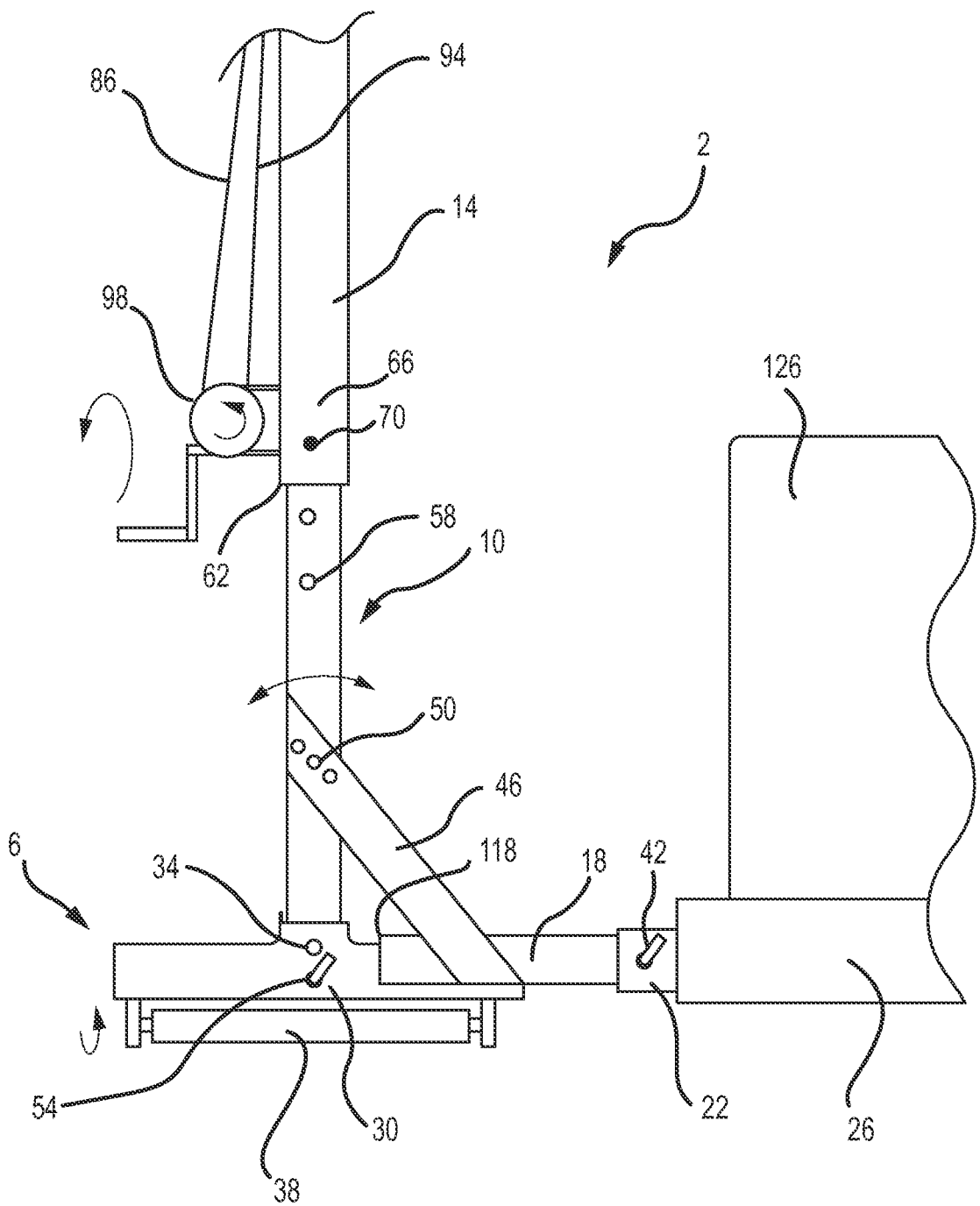
FIG. 2 is a partial side elevation view of a hide removal apparatus of one embodiment of the present invention.

Next, the hunter interconnects the winch segment 14 to the riser 10. In the embodiment shown, the winch segment 14 is interconnected by way of a telescoping interconnection. However, other interconnection methods may be used without departing from the scope of the invention. A hole 66 of the winch segment 14 is aligned with one of the riser's height adjustment holes 58. As one of skill in the art will appreciate, larger carcasses, such as elk, may require the height of the apparatus be maximized, as shown in FIG. 2. Other animals, such as deer or antelope, may be accommodated by using a lower height adjustment hole. After the height is set, the winch segment 14 is fastened to the riser 10 by way of a pin 70. Again, interconnecting the winch segment 14 to the riser 10 is performed while the riser 10 and the winch segment 14 are substantially horizontal, which makes assembly less difficult for a lone hunter.

Figure 3:
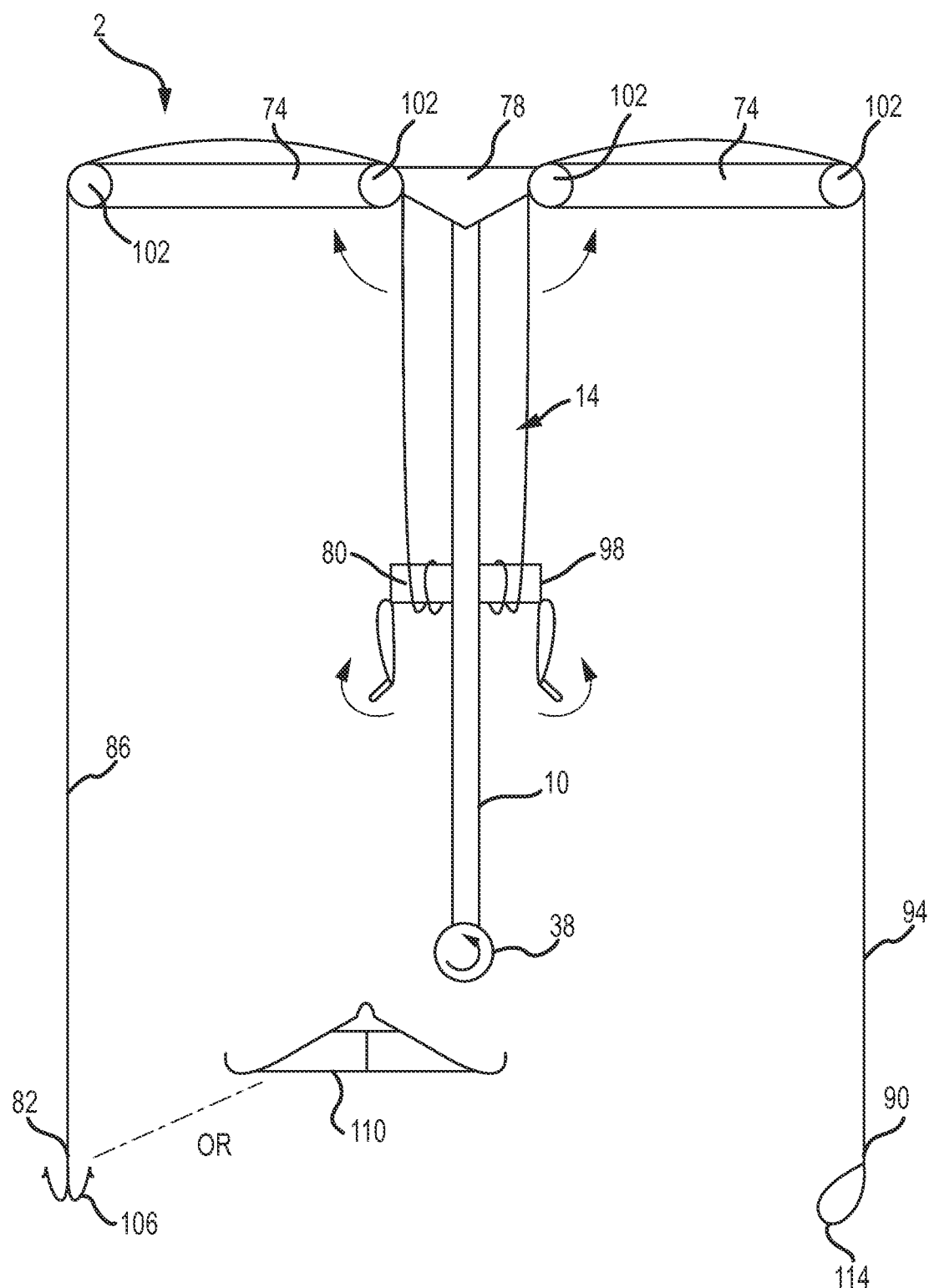
FIG. 3 is a schematic of the hide removal apparatus of one embodiment of the present invention.

Next, as shown in FIG. 3, arms 74 associated with an upper end 78 of the winch segment 14 are rotated outwardly and fixed in a generally perpendicular orientation by pins (not shown). The winch segment 14 includes a lift winch 80 for receiving one end 82 of a lift cable 86. The winch segment 14 also includes a puller winch 98 that receives one end 90 of a puller cable 94. The lift winch 80 may be hand operated and is used to lift a carcass from the ground. The puller winch 98 is used to remove the hide from the hanging carcass. Ideally, the lift cable 86 and the puller cable 94, which are associated with pulleys 102 (or rollers, or other friction reducing devices), are in place before and after the arms 74 are deployed. The lift cable 86 may include a hook 106 or a gambrel 110 that receives the carcass's rear legs. The other end of the puller cable 94 is associated with a cinch 114 that grasps a portion of the hide.

After the arms 74 are deployed and the cables are attached (if necessary), the hunter rotates the riser 10 and winch segment 14 upwardly using the pin 54 interconnected through the first hole 30 in the roller section 6 as a pivot. The roller section 6 includes a lip 118, which prevents the riser 10 from rotating to a degree that would damage the vehicle 126 (sometimes referred to a "truck" herein). More specifically, if over-rotation occurs, the lip 118 will cease rotation which could harm the vehicle 26 or the hunter. After the riser 10 is interconnected and positioned as desired, a pin 22 is placed through the second hole 34 of the roller section 6 and through a corresponding hole (not shown) of the riser 10.

As mentioned above, some embodiments of the present invention include a stabilizer 46. In these embodiments, the second hole 34 associated the roller section 6 and the riser 10 and may not be required wherein a slope adjustment hole 50 of the stabilizer 46 is aligned with a corresponding hole in the riser 10. The stabilizer's 46 holes 50 allow the operator to tilt the riser 10 away from the vehicle, align the riser 10 vertically, or to tilt the riser 10 towards the vehicle. In the latter configuration, the riser 10 may be tilted towards the vehicle 126 such that work done on the carcass occurs over the truck bed.

Figure 4:
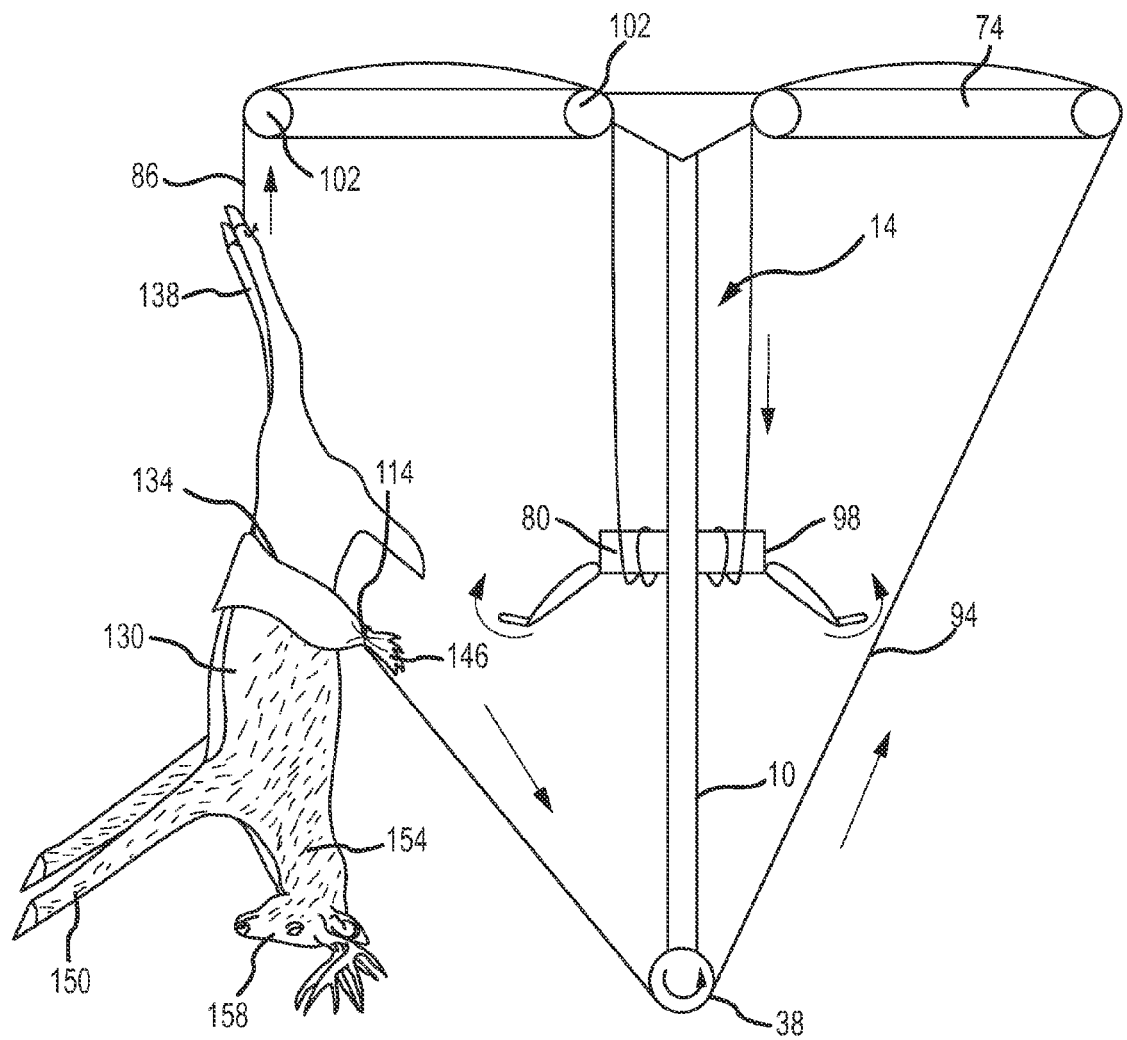
FIG. 4 is a schematic of the hide removal apparatus of FIG. 2 showing a lifted carcass with a portion of the hide pulled therefrom.
Figure 5:
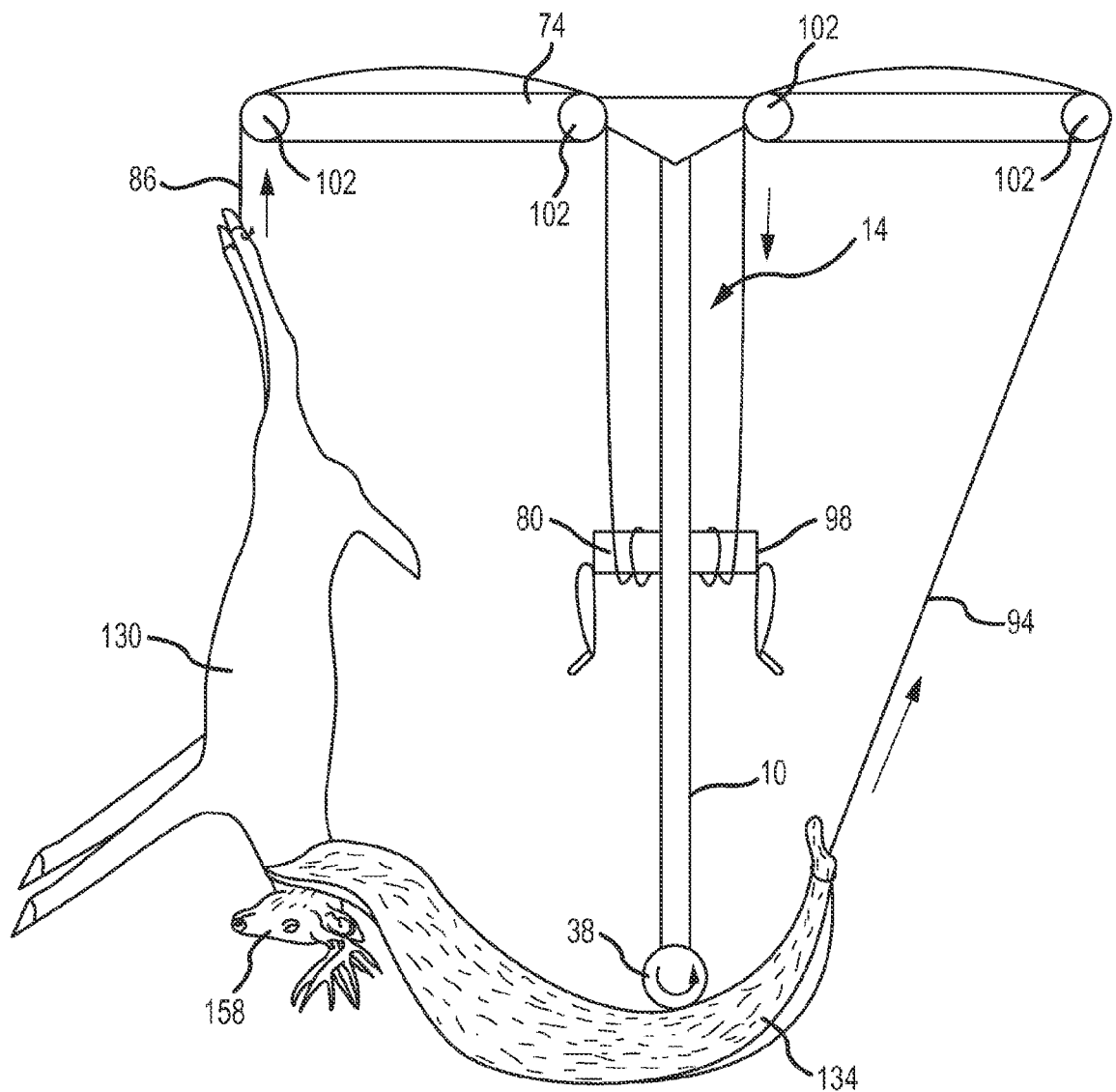
FIG. 5 is a schematic of the hide removal apparatus of FIG. 2 showing a lifted carcass with the majority of the hide removed therefrom.

FIGS. 4 and 5 show the operation of one embodiment of the present invention. After the internal organs of a carcass 130 are removed, portions of the hide 134 associated with the rear legs 138 are removed. In addition, a portion of the tail and associated hide 134 are partially removed from the carcass 130 to create a tuft 146 for receipt of the cinch 114, which will be described below. Further, the hunter will create an incision in the hide along the belly up to the brisket. Other cuts along the carcass's front legs 150 and under its neck 154 may also be made before lifting the carcass 130 or during the hide removal operations, depending on the condition of the carcass and the hunter's desires. One of skill in the art will appreciate that the hide removal apparatus 2 may be strong enough to lift a carcass 130 with its internal organs intact which may be desired. However, for this discussion, it is assumed the internal organs have been removed. The carcass's rear legs 138 are connected to the lift cable 86 by way of a hook 106 or gambrel 110 and the carcass 130 is lifted from the ground by operation of the lift winch 80. One of skill in the art will appreciate that although a hand-operated winch is shown, a powered winch may be used without departing from the scope of the invention. Still other embodiments of the present invention utilize a vehicle winch or pulley system.

As shown in FIG. 5, after the carcass 130 is lifted a predetermined amount, the hunter locks the lift cable 86 relative to the lift winch 80, which maintains the desired carcass elevation. Next, the hunter slackens the puller cable 94, positions it under the roller 18, and interconnects the cinch 114 to the tuft 146 of the hide 134 discussed above. The puller 98 winch is then operated to wrap the puller cable 94 therearound, which also pulls a portion of the puller cable 94 interconnected to the carcass 130 downwardly to remove the hide 134 from the carcass 130 in a slow and controlled fashion. The load acting on the puller cable 94 is reacted by the roller 38 and arm pulleys 102. Some embodiments of the present invention employ a puller winch 98 that can operate at various levels and speeds. One embodiment of the present invention uses a winch made by Dutton-Lainson WG1500. Other embodiments of the present invention use a winch that allows for the lift cable 86 and the puller cable 94 to be wound simultaneously, which speeds up the hide removal operation.

The cinch 114 will eventually move to the side opposite the carcass 130 which will pull the hide 134 under the roller 38. At some point, the hide 134 will be removed from the carcass 130 up to its neck 154. Thereafter, the hunter can take advantage of the carcass's 130 stretched neck 154 and easily remove the head 158 therefrom. One advantage of embodiments of the present invention is that by removing the hide 134 in this fashion, the carcass 130 will be generally free of hair and other debris. And, as the hide 134 is pulled from the carcass 130, as shown in FIG. 5, it will remain off the ground, clean, and in a single piece, which is desirable.

After hide removal is complete, the puller cable 94 and the lift cable 86 can be slackened and the device disassembled in reverse order from that described above. Again, the apparatus is designed to fold and compartmentalize so it is easy to be stored within a truck that, for example. Although a truck and trailer hitch is described, one of skill in the art will appreciate this apparatus or similar apparatus may be modified to interconnect to a tree or to an all terrain vehicle.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. A hide removal apparatus, comprising:
   a roller section adapted for interconnection to a vehicle, said roller section having a roller operatively interconnected thereto;
   a riser interconnected to said roller section;
   a winch segment having a portion interconnected to said riser, said winch segment including a first winch, a second winch, and selectively deployable first and second arms, said first and second arms having first ends that are rotateably interconnected to an upper portion of said winch segment and second ends, wherein pulleys are operatively associated with said first ends and said second ends;
   a lift cable interconnected to said first winch, and operatively engaged onto pulleys of said first arm, said lift cable having hooks adapted for selectively interconnecting to a portion of a carcass; and
   a puller cable interconnected to said second winch, and operatively engaged onto pulleys of said second arm, said puller cable having a cinch adapted for selectively interconnecting to another portion of the carcass.

2. The apparatus of claim 1, wherein said second winch is powered.

3. The apparatus of claim 1, wherein said winch segment is interconnectable to said riser in more than one location, such that the height of the apparatus is selectively alterable.

4. The apparatus of claim 1, wherein said riser and said winch segment comprise a one-piece unit.

5. The apparatus of claim 1, wherein said roller section has a tube adapted for selective interconnection to a trailer hitch receiver of the vehicle, and further comprising a stabilizer interconnected to said riser and said tube.

6. The apparatus of claim 5, wherein the interconnection between said stabilizer and said riser can be altered to selectively change the angle of said riser and winch segment.

7. A hide removal apparatus, comprising:
   a roller section adapted for interconnection to a vehicle, said roller section having a roller operatively interconnected thereto;
   a riser selectively interconnected to said roller section;
   a winch segment interconnected to said riser, said winch segment including a first winch, a second winch, and first and second arms, said first and second arms having first ends that generally coincide with an upper portion of said winch segment and second ends, said first and second arms having means for operatively receiving and supporting a cable;
   a lift cable interconnected to said first winch, and operatively engaged onto said means for operatively receiving and supporting a cable of said first arm, said lift cable having an end for selective interconnection of a carcass; and
   a puller cable interconnected to said second winch, and operatively engaged onto said means for operatively receiving and supporting a cable of said first arm, said lift cable having an end for selective interconnection to another portion of the carcass.

8. The apparatus of claim 7, wherein said means for operatively receiving and supporting a cable are pulleys that are operatively associated with said first ends and said second ends of said arms.

9. The apparatus of claim 7, wherein said second winch is powered.

10. The apparatus of claim 7, wherein said winch segment is interconnectable to said riser in more than one location, such that the height of the apparatus is selectively alterable.

11. The apparatus of claim 7, wherein said riser and said winch segment comprise a one-piece unit.

12. The apparatus of claim 7, wherein said roller section has a tube adapted for selective interconnection to a trailer hitch receiver of the vehicle, and further comprising a stabilizer interconnected to said riser and said tube.

13. The apparatus of claim 12, wherein the interconnection between said stabilizer and said riser can be altered to selectively change the angle of said riser and winch segment.

14. A method of removing a hide from an animal, comprising:
   interconnecting a first end of a lift cable to a first portion of an animal;
   interconnecting a second end of said lift cable to a first winch;
   interconnecting a first end of a puller cable to a second portion of an animal;
   interconnecting a second end of said puller cable to a second winch;

winding said first winch to raise the animal a predetermined distance above the ground;

winding said second winch to pull the hide from said carcass; and deploying arms for receiving said lift cable and said puller cable, said arms positioned above said lift winch.

15. The method of claim 14, wherein said puller cable is engaged onto a roller that is below said puller winch, and said puller cable is initially directed downwardly.

16. The method of claim 14, further comprising:

providing a roller section adapted for interconnection to a vehicle, said roller section having a roller operatively interconnected thereto, said puller cable is engaged onto a roller of said roller section that is located below said puller winch, and said puller cable is initially directed downwardly;

a riser selectively interconnected to said roller section; and a winch segment interconnected to said riser, said winch segment including said first winch, said second winch, and first and second arms, said first and second arms having first ends that generally coincide with an upper portion of said winch segment and second ends, said first and second arms having at least one pulley.

17. A method of removing a hide from an animal, comprising:

interconnecting a first end of a lift cable to a first portion of an animal;

interconnecting a second end of said lift cable to a first winch;

interconnecting a first end of a puller cable to a second portion of an animal;

interconnecting a second end of said puller cable to a second winch;

winding said first winch to raise the animal a predetermined distance above the ground;

winding said second winch to pull the hide from said carcass;

providing a roller section adapted for interconnection to a vehicle, said roller section having a roller operatively interconnected thereto, said puller cable is engaged onto a roller of said roller section that is located below said puller winch, and said puller cable is initially directed downwardly;

a riser selectively interconnected to said roller section; and a winch segment interconnected to said riser, said winch segment including said first winch, said second winch, and first and second arms, said first and second arms having first ends that generally coincide with an upper portion of said winch segment and second ends, said first and second arms having at least one pulley.

18. The method of claim 17, wherein said puller cable is engaged onto a roller that is below said puller winch, and said puller cable is initially directed downwardly.

\* \* \* \* \*